United States Patent [19]

Mohr

[11] Patent Number: 4,855,269
[45] Date of Patent: Aug. 8, 1989

[54] PROCESS FOR REGENERATING A MONOFUNCTIONAL LARGE-PORE ZEOLITE CATALYST HAVING HIGH SELECTIVITY FOR PARAFFIN DEHYDROCYCLIZATION

[75] Inventor: Donald H. Mohr, Albany, Calif.

[73] Assignee: Chevron Research Company, San Francisco, Calif.

[21] Appl. No.: 67,920

[22] Filed: Jun. 29, 1987

Related U.S. Application Data

[63] Continuation-in-part of Ser. No. 944,403, Dec. 19, 1986, abandoned.

[51] Int. Cl.$^4$ .......... B01J 29/38; B01J 23/96; C07C 2/52; C10G 35/095
[52] U.S. Cl. .......... 502/37; 208/140; 502/66; 502/74; 585/419
[58] Field of Search .......... 502/35–37, 502/517

[56] References Cited

U.S. PATENT DOCUMENTS

| | | | |
|---|---|---|---|
| 2,853,435 | 9/1958 | Evering et al. | 196/50 |
| 2,892,770 | 6/1959 | Coley et al. | 208/140 |
| 3,418,256 | 12/1968 | Rigney et al. | 252/415 |
| 3,617,523 | 11/1971 | Spurlock | 208/140 |
| 3,622,520 | 11/1971 | Hayes | 252/415 |
| 3,986,982 | 10/1976 | Crowson et al. | 502/37 |
| 4,033,898 | 7/1977 | Jacobson et al. | 252/416 |
| 4,417,083 | 11/1983 | Bernard et al. | 585/419 |
| 4,435,283 | 3/1984 | Buss et al. | 585/419 |
| 4,493,901 | 1/1985 | Bernard et al. | 502/37 |
| 4,645,751 | 2/1987 | McCullen et al. | 502/37 |
| 4,657,874 | 4/1987 | Borghard et al. | 502/37 |

FOREIGN PATENT DOCUMENTS 0142352  5/1985  European Pat. Off. .
1585040  2/1981  United Kingdom .

OTHER PUBLICATIONS

Patent Abstracts of Japan, vol. 7, No. 285 (C-201) (1430), 20 Dec. 1983 and Japanese Patent Application 58164527 (Teijin Yuka K.K.) 29 Sep. 1983 (provided only as an abstract).

Primary Examiner—Paul E. Konopka

[57] ABSTRACT

The present invention is a process for regenerating a large-pore zeolitic catalyst that has been deactivated by the formation of Group VIII metal agglomerates on the catalyst surface. In the process, the Group VIII metal agglomerates are redispersed to produce agglomerates of small size. It comprises an oxychlorination step, a nitrogen purge step and a reduction step.

5 Claims, No Drawings

PROCESS FOR REGENERATING A MONOFUNCTIONAL LARGE-PORE ZEOLITE CATALYST HAVING HIGH SELECTIVITY FOR PARAFFIN DEHYDROCYCLIZATION

CROSS-REFERENCE TO RELATED APPLICATION

This application is a continuation-in-part of U.S. Ser. No. 944,403, filed Dec. 19, 1986, now abandoned and which is hereby incorporated by reference in its entirety.

FIELD OF INVENTION

The present invention relates to regenerating contaminated catalysts. More specifically, this application is directed to regenerating large-pore zeolite catalysts.

BACKGROUND OF THE INVENTION

The invention described below relates to a process for regenerating large-pore zeolite catalysts having a Group VIII metal which are used to reform petroleum feedstocks. Within the past few years such catalysts have become the object of considerable interest primarily due to their surprisingly high selectivity for paraffin dehydrocyclization to produce aromatics under low pressure reforming conditions. However, it has also been found that such catalysts are sensitive to certain types of contamination. Accordingly, there is an urgent need for a regeneration procedure for these catalysts.

During reforming, conventional catalysts become deactivated by changes in the physical state of the catalytic metal and the accumulation of carbonaceous matter (such as coke) on the catalyst surface. When deactivation occurs, it is common practice to regenerate the catalyst. U.S. Pat. No. 3,496,096 granted on Feb. 17, 1970 to Kluksdahl, describes a catalyst regeneration procedure for a platinum/rhenium catalyst. The procedure involves three steps. In the first step the catalyst is contacted with an oxygen containing gas at a temperature of less than 800° F. which burns coke off the catalyst surface. In the second step the catalyst is again contacted with a gas containing oxygen and a halide, but this time the temperature is between 800° F. and 900° F. In the final step the catalyst is contacted with a gas having a higher oxygen concentration and halide but at a temperature above 900° F. The regenerated catalyst is then contacted with a gas containing hydrogen to reduce the valence states of the oxidized platinum and rhenium. Regeneration procedures such as this one have become known in the art as oxychlorination procedures (see also U.S. Pat. No. 3,776,640 granted on Dec. 4, 1973 to Moravec et al. which describes a similar procedure for removing coke). One of their purposes is to redisperse platinum agglomerates which are formed during reforming or the coke burn.

U.S. Pat. No. 4,493,901 granted on Jan. 15, 1985 to Bernard et al. discloses a regeneration procedure for a coke deactivated zeolite reforming catalyst. Patentees use a hydration step following a coke burn and an oxychlorination step. The hydration step is carried out while contacting the catalyst with cool air after the oxychlorination step. Patentees add approximately 10 wt.% water to the cooling air.

European Patent Application No. 0 142 352 (Publication Number) filed on Nov. 9, 1984 broadly describes a regeneration procedure for deactivated L-zeolite catalysts. The deactivation addressed by the disclosed procedure is caused by coke deposition and platinum agglomeration. Applicants employ a coke burn step and an oxychlorination step. However, when the redispersion procedures outlined in the European patent application are attempted on catalysts that have a binder, such as silica or alumina, the activity of the regenerated catalyst is substantially lower than that of the fresh catalyst.

Sulfur may also cause catalyst deactivation. This is a particular problem for large-pore zeolite catalysts having a Group VIII metal. See U.S. Pat. No. 4,456,527 granted June 26, 1984 to Buss et al.

Accordingly, there is still a need for a procedure which can restore the activity of large-pore zeolitic catalysts having an inorganic binder which have been deactivated in whole or in part by the formation of platinum agglomerates. This need has now been satisfied by the invention which is summarized and detailed below.

SUMMARY OF THE INVENTION

According to the present invention, a process is provided for redispersing platinum on a catalyst comprising L-zeolite and an inorganic oxide binder. The process comprises (a) oxychlorinating the catalyst under oxychlorinating conditions; (b) contacting the catalyst with an inert gas; and (c) contacting the catalyst with dry hydrogen. The catalyst is preferably bound with clay, alumina, silica, or silica-alumina. Preferably, the hydrogen stream contains less than 1000 ppm water, more preferably less than 500 ppm water, most preferably less than 100 ppm water. It is also preferred that the inert gas is nitrogen and it preferably contacts the catalyst for a time between 10 minutes and 1 hour and 30 minutes.

The process more preferably comprises (a) contacting the catalyst under oxychlorinating conditions with a gas comprising 1% to 21% oxygen, 1% to 4% water, and an effective amount of chlorine atoms to achieve a chlorine to platinum ratio between 4:1 and 1000:1; (b) contacting the catalyst with a gas comprising nitrogen, for a time between 10 minutes and 1½ hours, at a gas flow rate of between 150 and 1500 GHSV, and at a temperature between 850° and 950° F.; and (c) contacting the catalyst with a gas comprising hydrogen having less than 1000 ppm water, at a temperature between 800° and 950° F. and a gas rate between 150 and 1500 GHSV.

Among other factors, the process of the present invention is based on my finding that a catalyst having a Group VIII metal, an inorganic oxide binder, and L-zeolite can be regenerated to an unexpectedly high activity by using relatively low severity conditions in the reduction step of the process. Preferably, the lower severity conditions include the use of relatively lower temperature in the reduction step than is typical in prior art processes and also the use of substantially dry hydrogen in this step. Additionally, I have found that higher activity can be achieved if the inert gas purge time is limited in the process.

Gas flow rates are also an important element of the catalyst regeneration process of the present invention. I have found that the gas flow rate in steps (a), (b) and (c) of the process should be maintained at a relatively high level to attain regeneration of the catalyst to high activity. If the flow rate is diminished for step (a), (b) or (c), then the exposure time preferably is increased to attain the high activity upon regeneration.

DETAILED DESCRIPTION OF THE INVENTION

The following discussion presents a more detailed discussion of the present invention.

Monofunctional Large Pore Zeolite Catalysts

As explained in the Summary section, the present invention is a procedure for regenerating large-pore zeolite catalysts. Hereinafter, the large-pore zeolite catalysts will simply be referred to as "catalysts". These catalysts generally comprise: a large-pore zeolite; a Group VIII metal (such as noble metal, or more specifically, platinum); preferably the zeolite also contains a metal from either Group IA or IIA. Preferably, the large-pore zeolite is L-zeolite.

Large pore zeolites are defined as zeolites having an effective pore diameter between 6 and 15 Angstroms. Among the large-pore zeolites which have been found to be useful in the practice of the present invention, type L zeolite, zeolite X, and zeolite Y are the most important and have apparent pore sizes on the order of 7 to 9 Angstroms.

A composition of type L-zeolite, expressed in terms of model ratios of oxides, may be represented as follows:

$(0.9-1.3)M_{2/n}O:Al_2O_3(5.2-6.9)SiO_2:yH_2O$ wherein M designates a cation, n represents the valence of M, and y may be any value from 0 to 9. Zeolite L, its X-ray diffraction pattern, its properties, and method for its preparation are described in detail in U.S. Pat. No. 3,216,789 which is hereby incorporated by reference in its entirety. The real formula may vary without changing the crystalline structure; for example, the mole ratio of silicon to aluminum (Si/Al) may vary from 1.5 to 3.5.

The chemical formula for zeolite Y expressed in terms of mole oxides may be written as:

$(0.7-1.1)Na_2O:Al_2O_3:xSiO_2:yH_2O$ wherein x is a value between 3 and 6, and y may be a value up to about 9. Zeolite Y has a characteristic X-ray diffraction pattern which may be employed with the above formula for identification. Zeolite Y is described in more detail in U.S. Pat. No. 3,130,007. U.S. Pat. No. 3,130,007 is hereby incorporated by reference in its entirety to show a zeolite useful in the present invention.

Zeolite X is a synthetic crystalline zeolitic molecular sieve which may be represented by the formula:

$(0.7-1.1)M_{2/n}O:Al_2O_3:(2.0-3.0)SiO_2:yH_2O$ wherein M represents a metal, particularly, alkali and alkaline earth metals, n is the valence of M, and y may have any value up to about 8 depending on the identity of M and the degree of hydration of the crystalline zeolite. Zeolite X, its X-ray diffraction pattern, its properties, and method for its preparation are described in detail in U.S. Pat. No. 2,882,244. U.S. Pat. No. 2,882,244 is hereby incorporated by reference in its entirety to show a zeolite useful in the present invention.

These zeolites contain exchangeable cations. Common cations that are useful for catalysts of this invention are in Groups IA (alkali metals) and IIA (alkaline earth metals). When Group IA, alkali metals are used, sodium, potassium, lithium, rubidium, or cesium are preferred. When Group IIA, alkaline earth metals are used, either barium, calcium, or strontium is preferred. The alkaline earth metal can be incorporated into the zeolite by synthesis, impregnation or ion exchange.

In the present regeneration process it is important for the catalysts of this invention to contain one or more Group VIII metals, e.g., ruthenium, rhodium, palladium, iridium, or platinum. The preferred Group VIII metals are iridium, palladium, and particularly platinum. (When reference is made to a specific Group VIII metal, such as platinum, in this application it is used as a representative of the group.) The preferred percentage of platinum, in the catalyst is between 0.1% and 5%, the lower limit corresponding to minimum practical catalyst activity and the upper limit to roughly the maximum possible platinum utilization.

Group VIII metals are introduced into the large-pore zeolite during synthesis, impregnation or exchange in an aqueous solution of an appropriate salt. If it is desired to introduce two Group VIII metals into the large-pore zeolite, the operation may be carried out simultaneously or sequentially.

By way of example, platinum can be introduced by impregnating the large-pore zeolite with an aqueous solution of tetrammineplatinum (II) nitrate [Pt(NH$_3$)$_4$](NO$_3$)$_2$, tetrammineplatinum (II) chloride [Pt(NH$_3$)$_4$]Cl$_2$, or dinitrodiamino-platinum [Pt(NH$_3$)$_2$(NO$_2$)$_2$]. In an ionexchange process, platinum can be introduced by using cationic platinum complexes such as tetrammineplatinum (II) nitrate.

The presence of a binder is important in the present process. An inorganic oxide is used as a matrix to bind the large-pore zeolite. This binder can be a natural or a synthetically produced inorganic oxide or combination of inorganic oxides. Typical inorganic oxide binders which can be used include clays, alumina, silica or mixtures thereof. Preferable binders are alumina, silica, or mixtures thereof. Acidic sites on the binder are preferably exchanged by cations which do not impart strong acidity (such as sodium, potassium, rubidium, cesium, calcium, strontium, or barium).

After the desired metal or metals have been introduced, the catalyst should be calcined in air and then reduced in hydrogen. The catalyst may have a limited aqueous soak time and also be calcined in a steam-air mixture as specified in U.S. Pat. No. 4,608,356 granted Aug. 26, 1986 to Buss et al which is hereby incorporated by reference in its entirety. At this stage it is ready for use in the dehydrocyclization process.

The regeneration process of the present invention may be used on catalysts in the form of extrusions, pills, pellets, granules, broken fragments, or various other special shapes. The catalysts can become deactivated in any of the conventional types of equipment used for catalytic reforming.

Sulfur and Coke Contamination

The present regeneration process is necessary due to platinum agglomeration which is a typical consequence of various types of contamination. For example, sulfur and coke contamination.

The sulfur sensitivity of these catalysts is known from U.S. Pat. No. 4,456,527 to Buss et al which is hereby incorporated by reference in its entirety. Sulfur contamination quickly lowers the catalytic activity for reforming reactions. To remove sulfur, various procedures have been designed, for example, see U.S. Ser. No. 944,403 which is hereby incorporated by reference in its entirety.

Coke can also contaminate and deactivate the catalyst and can be generally described as an expected result of the reforming process. Hydrocarbons contact the catalyst and are dehydrogenated, some to the extent that only coke is left on the catalyst. As time increases, coke deposition forces an adjustment of the process conditions to maintain a certain target octane number. However, there comes a time when the process conditions can no longer be adjusted to compensate for coke deposition (much like sulfur contamination). It is at this point that the catalyst must be regenerated to restore its activity.

Sulfur and Coke Removal

Coke and sulfur removal processes are typically used prior to the present regeneration process. This removal preferably involves some type of oxidation at least. When sulfur is removed in the fashion described in U.S. Ser. No. 944,403, the platinum particles are intentionally formed into large agglomerates. In this form, the catalyst is completely inactive for reforming. Consequently, the platinum must be redispersed to restore the catalytic properties of the catalyst.

Likewise, when coke is removed from the catalyst by oxidation, platinum agglomerates are lilely to form if they are not already present as a result of the reforming process itself. Typically, an oxidation step is used in advance of the basic oxychlorination process to burn coke off the catalyst. A preferred example is as follows: The catalyst is preferably contacted with a gas containing between 0.1 and 2.0 vol. % oxygen (for the purposes of this application gas concentrations are expressed as a percent of the total volume). When more than 0.5% $O_2$ is present in the gas, care should be taken to minimize the catalyst temperature until the carbon level has been substantially reduced. Nitrogen or another inert gas is preferably present in a sufficient amount to make up the remainder of the gas. The temperature is preferably between 500° F. and 800° F. The gas flow is preferably between 150 and 5000 GHSV, more preferably between 150 and 1500 GHSV. The pressure preferably ranges between 1 and 30 atmospheres, more preferably between 1 and 10 atmospheres. Water is preferred in a range between 0% and 10%. The catalyst is oxidized until sufficient coke has been removed. The time can preferably range between 15 minutes and 10 hours, more preferably between 30 minutes and 5 hours.

After coke or sulfur removal, the average size of the platinum agglomerates can range from 10 to 300 Angstroms (depending on the conditions used for removing the coke or sulfur). Platinum agglomerates of this size must be redistributed over the catalyst to form particles smaller than approximately 10 Angstroms. This is necessary if the catalyst is to have an appreciable activity for aromatization.

Oxychlorination

The present regeneration process provides a method for redispersing Group VIII metal agglomerates by an oxychlorination procedure. Basically, the oxychlorination procedure comprises contacting the catalyst with an oxygen-containing gas and a chloride-containing gas followed by a nitrogen purge and a reduction. The procedure involves three steps.

In the first step the catalyst having platinum agglomerates is contacted with a mixture of air, water, and chloride or chlorine atoms. Oxygen is preferably present in a concentration of greater than 0.1%, more preferably between 1% and 21% of the total gas volume. Water is preferably present in a range of from 0.1% to 10%, more preferably from 1% to 4%, and most preferably from 2% to 3%. The chloride or chlorine atoms are preferably present in an amount sufficient to achieve a ratio of chlorine to platinum atoms of between 4:1 and 1000:1, more preferably between 5:1 and 200:1, and most preferably between 10:1 and 50:1. Examples of possible chlorine or chloride compounds are: chlorine gas; organic chlorides, such as carbon tetrachloride ($CCl_4$); or hydrogen chloride (HCl). The temperature for the first step is preferably between 800° F. and 1100° F., more preferably between 900° F. and 1000° F., and most preferably between 925° F. and 975° F. The time for the first step is preferably from 1 to 24 hours, more preferably 1 to 3 hours. The space velocity is preferably between 150 and 5000 GHSV, more preferably between 150 and 1500 GHSV. Pressure is preferably between 1 and 30 atmospheres, more preferably between 1 and 10 atmospheres.

In the second step (also called a nitrogen purge) the catalyst is preferably contacted with a dry inert gas, more preferably nitrogen, for a time sufficient to purge the catalyst bed of oxygen. "Dry" means having preferably less than 1000 ppm water, more preferably less than 500 ppm water, and most preferably less than 100 ppm water. This nitrogen purge step is preferably between 10 minutes and 1½ hours, more preferably between 10 minutes and 1 hour. The temperature is preferably between from 800° F. and 1000° F., more preferably between 850° F. and 950° F., but most preferably between 875° F. and 925° F. The gas velocities and pressures should be in the same ranges as the first step.

In the third and final step (also called a hydrogen reduction step), the catalyst is preferably contacted with dry hydrogen for a time sufficient to reduce all the exposed platinum. "Dry" means having preferably less than 1000 ppm water, more preferably less than 500 ppm water, and most preferably less than 100 ppm water. This time is dependent on the hydrogen flow and the reduction temperature. A shorter time is preferred based on commercial considerations, for example, preferably less than 5 hours, or more preferably between 1 and 4 hours. The temperatures is preferably between 600° F. and 1000° F., more preferably between 800° F. and 950° F., and most preferably between 875° F. and 925° F. The gas velocities and pressures are preferably in the same ranges as the first and second steps.

An oxygen post-treatment step can be inserted between the first and second steps. In the oxygen post-treatment, the catalyst is preferably contacted with an oxygen-containing gas having an oxygen concentration greater than 0.1%, more preferably between 1% and 21%. The temperature is preferably between 800° F. and 1000° F., more preferably between 900° F. and 975° F. Water is preferably present in an amount between 0 and 10%, more preferably between 1% and 4%, and most preferably between 2% and 3%. The gas velocities and pressures are preferably in the same ranges as the first, second and third steps.

It has been surprisingly found that in the final hydrogen reduction step the hydrogen should preferably have less than 1000 ppm water, more preferably less than 500 ppm water, and most preferably, less than 100 ppm water. Also, the amount of hydrogen preferably should be greater than 2 moles $H_2$/mole platinum, more preferably greater than 10 moles $H_2$/mole platinum. Preferably, the hydrogen should have a total gas concentration of between 1 vol. % and 100 vol. %, more preferably 10% and 100%, and most preferably 50% and 100%. If there is less than 100% hydrogen, then an inert gas should preferably constitute the remainder of the gas.

The following examples are presented here as specific embodiments of the overall concept of the present invention. They are intended to be exemplary and not restrictive in any way.

EXAMPLES

EXAMPLE 1

The following example shows the regeneration of a sulfur contaminated catalyst according to the present invention. A catalyst comprising 0.8% platinum on a barium-potassium L-zeolite containing 8% barium was sulfided until it accumulated 317 ppm of sulfur and was substantially deactivated for paraffin dehydrocyclization [this is an isothermal test in which a light naphtha containing mostly $C_6$–$C_8$ paraffins was reformed at 920° F., 100 psig and 6 liquid hourly space velocity]. Platinum atoms on the surface of the catalyst were observed by transmission electron microscopy (TEM) and occurred in groups which are 10 to 20 Angstroms in diameter.

The deactivated catalyst was then subjected to a sulfur removal step which is as follows. The catalyst was contacted with a gaseous stream of 1% $O_2$ 99% $N_2$ at 900° F. and 250 GHSV for 24 hours. Then the catalyst was contacted with a gaseous stream of carbon monoxide which had been bubbled through a 32% HCl solution to give 3.5% HCl, 1% $H_2O$, 95.5% CO. This operation was conducted at 900° F. and 250 GHSV, for 24 hours. The sulfur concentration of the catalyst after treatment was 80 ppm. Platinum agglomerates, in the form of cubic crystals about 30 to 80 Angstroms in the edge length, were observed on the catalyst by TEM. The catalyst was completely inactive for reforming reactions, including cyclohexane dehydrogenation.

To restore activity to the catalyst, it was subjected to an oxychlorination step. This process was conducted as follows. The catalyst was contacted with wet air, at a flow rate of 1440 GHSV, and a temperature of 1000° F. for 1 hour. The wet air in this and later examples contained approximately 2% $H_2O$ and was obtained by saturating air with water at room temperature. The pressure for this, and all further examples (unless noted), was 1 atmosphere. Then the catalyst was contacted with a gaseous mixture of wet air at 1440 GHSV and a temperature of 900° F. for 2 hours, while chloride was injected as carbon tetrachloride (CCl$_4$) at a ratio of approximately 20 chlorine atoms per 1 platinum atom. Thereafter, the wet air mixture was continued at 1440 GHSV and 900° F. for an additional hour but without the CCl$_4$. Then, dry nitrogen was contacted with the catalyst at 1440 GHSV and 900° F. for 10 minutes. Following that, dry hydrogen was contacted with the catalyst at 1440 GHSV and a temperature of 900° F. for 1 hour. After this procedure, the catalyst was analyzed by TEM and it was observed that the only visible platinum was present in agglomerates of 10 Angstroms or smaller. After 20 hours onstream the catalyst was then tested for paraffin dehydrocyclization and it was found to have about 40% of the activity of the fresh catalyst also measured after 20 hours onstream. (K regenerated catalyst/K fresh catalyst=0.40) (K=(selectivity) [ln (1-conversion)]).

EXAMPLE 2

The following example shows regeneration of a deactivated catalyst according to the present invention. Fresh, bound catalyst comprising 0.8% platinum on a barium-potassium L-zeolite containing 8% barium (metal concentrations are based on the weight of the zeolite, however, the catalyst was bound with 20% SiO$_2$ which changes the metal concentration for the bound catalyst) was reduced in $H_2$ at 900° F. for 1 hour, purged with $N_2$ and then heated in wet air for 1 hour at 1000° F. The resulting catalyst had a dehydrocyclization activity of $K/K_{fresh}=0.20$.

To restore the activity to the catalyst, it was subjected to the following oxychlorination step. The catalyst was contacted with a gaseous mixture of wet air at 1440 GHSV and a temperature of 950° F. for 2 hours, while chlorine was injected as carbon tetrachloride (CCl$_4$), at a ratio so that there were 20 chlorine atoms per 1 platinum atom. Then, dry nitrogen was injected at 1440 GHSV and 900° F. for 1 hour. Following that, dry hydrogen was contacted with the catalyst at 1440 GHSV and a temperature of 900° F. for 1 hour. The catalyst was then tested for paraffin dehydrocyclization and it was found that the activity was greater than the fresh catalyst (both measurements were made after 20 hours onstream) (K regenerated catalyst/K fresh catalyst=1.15) (K=(selectivity) [ln (1-conversion)]).

The catalysts in the following examples contained 0.8 wt. % platinum on a barium-potassium L-zeolite containing 8 wt. % barium, the weight percent calculated based on L-zeolite without a binder. Bound catalysts contain 20 wt. % inorganic binder, which reduced the overall platinum weight percent to 0.64% and the overall barium weight percent to 6.4%.

EXAMPLE 3

The following example shows a basic oxychlorination process using different conditions to achieve good results. It is not a strict example of the present invention because the L-zeolite is not bound and wet hydrogen is used.

Four fresh catalysts were taken and subjected to the following deactivation and regeneration conditions.

| Experiment No. | 216 | 234 | 238 | 242 |
|---|---|---|---|---|
| Fresh Catalyst | L-Zeolite 238; no binder. | | | |
| Deactivation Procedure | All catalysts were reduced in hydrogen at 900° F. for 1 hour. Then they were oxidized in wet 1% O$_2$ in the following conditions: | | | |
| | 1000° F. for 3 hrs | 1000° F. for 3 hrs. | 1050° F. for 16 hrs. | 1050° F. for 16 hrs. |
| Oxychlorination Procedure | All the catalysts were contacted with wet (about 2% H$_2$O) 1% O$_2$ and CCl$_4$ (at a ratio of 20 Cl/Pt atom) at 950° F. and 1440 GHSV for 2 hours. | | | |
| O$_2$ Post Treatment | All the catalysts were contacted with wet (about 2% H$_2$O) 1% O$_2$ at 950° F. for 1 hour at 1440 GHSV. | | | |
| N$_2$ Purge | All the catalysts were contacted with wet (about 2% H$_2$O) N$_2$ at 950° F. for 10 minutes at 1440 GHSV. | | | |
| H$_2$ Reduction | All the catalysts were reduced in wet (about 2% H$_2$O) hydrogen at 950° F. and | | | |

-continued

| Experiment No. | 216 | 234 | 238 | 242 |
|---|---|---|---|---|
| | 1440 GHSV for the following times: | | | |
| | 1 hr. | 2 hr. | 2 hr. | 2 hr. |
| Activity Test | The following conversions*[1] and selectivities*[2] were noted for each catalyst for 3 hrs. onstream/20 hrs. onstream: | | | |
| Conversion: | 78/69 | 79/71 | 77/69 | 78/69 |
| Selectivity: | 71/81 | 71/78 | 73/81 | 75/81 |

*[1]Conversion is defined as the fraction of the reactants that is converted to either aromatics or compounds with fewer than 6 carbon atoms.
*[2]Selectivity is defined as the fraction of converted reactants that are converted to aromatics.

EXAMPLE 4

The following catalysts were treated in a similar manner to those in Example 3, but these were deactivated by coke fouling. Again, it is not a strict example of the present process because the zeolite is not bound and wet hydrogen is used. However, it is useful to show that the process will work on an unbound, coke contaminated catalyst.

| Experiment No. | 222 | 230 |
|---|---|---|
| Fresh Catalyst | L-Zeolite 238; no binder. | |
| Deactivation Procedure | These catalysts were run in a pilot plant under standard reforming conditions until they were substantially deactivated for paraffin dehydrocyclization. | |
| Coke Burn | Both catalysts were contacted with 1% $O_2$ at 600° F. for 1 hr., then at 780° F. for 5 hrs. in the following amounts of $H_2O$: | |
| | About 2% | 0% |
| Oxychlorination Procedure | The catalysts were contacted with wet 1% $O_2$ for 2 hrs. at 950° F., 1440 GHSV and $CCl_4$ to achieve a 33:1 ratio of Cl/Pt. | |
| $O_2$ Post Treatment | The catalysts were contacted with wet 1% $O_2$ for 1 hr. at 950° F. and 1440 GHSV. | |
| $N_2$ Purge | Wet (about 2% $H_2O$) $N_2$ at 950° F. for 10 min. | |
| $H_2$ Reduction | Both catalysts were subjected to wet (about 2%) hydrogen at 950° F. for 3 hrs. | |
| Activity Test | | |
| Conversion: | 70/64 | 67/51 |
| Selectivity: | 76/80 | 71/76 |

EXAMPLE 5

This example shows that unacceptable results are obtained when wet hydrogen is used in regenerating a coke contaminated, bound catalyst. The following catalysts were treated in a similar manner to those of Example 4, however, a binder was used to hold the catalyst powder together.

| Experiment No. | 226 | 228 |
|---|---|---|
| Fresh Catalyst | L-zeolite 114 | L-zeolite 382 |
| Binder | $Al_2O_3$ | $SiO_2$ |
| Deactivation Procedure | The catalysts were run in a pilot plant under standard reforming conditions until they were substantially deactivated for paraffin dehydrocyclization. | |
| Coke Burn | The catalysts were contacted with 1% $O_2$ for 1 hr. then at 780° F. for 5 hrs., both without $H_2O$. | |
| Oxychlorination Procedure | The catalysts were contacted with wet 1% $O_2$ for 2 hrs. at 950° F., 1440 GHSV and $CCl_4$ to achieve a ratio of 20:1 Cl/Pt. | |

-continued

| Experiment No. | 226 | 228 |
|---|---|---|
| $O_2$ Post Treatment | The catalysts were contacted with wet 1% $O_2$ for 1 hr at 950° F. at 1440 GHSV. | |
| $N_2$ Purge | Wet $N_2$ at 950° F. and 1440 GHSV for: | |
| | 30 min. | 10 min. |
| $H_2$ Reduction | The catalysts were contacted with wet (about 2%) hydrogen at 950° F. for 3 hrs. | |
| Activity Test | | |
| Conversion: | 53/39 | 52/39 |
| Selectivity: | 65/70 | 67/70 |

EXAMPLE 6

This example shows that good results are obtained when dry $N_2$ and dry $H_2$ are used at lower temperatures on a bound catalyst.

| Experiment No. | 278 | 285 |
|---|---|---|
| Fresh Catalyst | L-zeolite 430 | L-zeolite 382 |
| Binder | $SiO_2$ | $SiO_2$ |
| Deactivation Procedure | Catalyst was reduced in hydrogen for 1 hr. at 900° F. Then it was oxidized in dry air at 1000° F. for 3 hrs. | Coke fouling as Example 5. |
| Coke Burn | No. | Coke burn as Example 5. |
| Oxychlorination Procedure | The catalyst was contacted with wet air at 950° F. for 2 hrs., 1440 GHSV, and enough $CCl_4$ to achieve a 20:1 Cl/Pt ratio. | The catalyst was contacted with wet air at 1000° F. for 1 hr. Then wet air at 950° F. for 2 hrs. with $CCl_4$ added to achieve 20:1 Cl/Pt. |
| $O_2$ Post Treatment | The catalyst was contacted with wet air at 950° F. for 1 hr. | The catalyst was contacted with wet air at 950° F. for 1 hr. |
| $N_2$ Purge | Dry $N_2$ at 900° F. for 1 hr. and 1440 GHSV. | |
| $H_2$ Reduction | Dry $H_2$ at 900° F. for 1 hr. and 1440 GHSV. | |
| Activity Test | | |
| Conversion: | 79/71 | 75/67 |
| Selectivity: | 82/88 | 81/87 |

EXAMPLE 7

This example shows the effect of treating the catalyst with dry $N_2$ for varying times in the nitrogen purge step.

| Experiment No. | 319 | 314 | 318 | 322 | 323 |
|---|---|---|---|---|---|
| Fresh Catalyst | L-zeolite 382 | | L-zeolite 485 | | |
| Binder | All catalysts had $SiO_2$ as a binder. | | | | |
| Deactivation Procedure | Coke fouling as Example 4. | | Catalyst was reduced in $H_2$ 1 hr., then oxidized in wet air at 1000° F. for 1 hr. | | |
| Coke Burn | Coke burn as Example 4. | | No. | | |
| Oxychlorination Procedure | 319 and 314 catalysts were contacted with wet air at 1000° F. for 1 hr. Then wet air at 950° F. 1440 GHSV for 2 hrs. and $CCl_4$ to achieve | | 318, 322, and 323 were contacted with wet air at 950° F. 1440 GHSV and $CCl_4$ to achieve a ratio of 20:1 Cl/Pt atoms. | | |

-continued

| Experiment No. | 319 | 314 | 318 | 322 | 323 |
|---|---|---|---|---|---|
| | a ratio of 20:1 Cl/Pt atoms. | | | | |
| O₂ Post Treatment | The catalyst were contacted with wet air at 950° F. for 1 hr. at 1440 GHSV. | | | | |
| N₂ Purge | All the catalysts were contacted with dry N₂ at 900° F. for the following time periods: | | | | |
| | 1 hr. | 2 hrs. | 6 hrs. | 16 hrs. | 30 min. |
| H₂ Reduction | All the catalysts were contacted with dry H₂ at 900° F. for the following time periods: | | | | |
| | 1 hr. | 4 hrs. | 4 hrs. | 4 hrs. | 1 hr. |
| Activity Test | | | | | |
| Conversion: | 75/70 | 64/60 | 64/49 | 67/52 | 67/58 |
| Selectivity: | 82/88 | 85/89 | 81/87 | 83/89 | 83/89 |

EXAMPLE 8

These experiments show the effect of a variety of flow rates.

| Experiment No. | 285 | 292 | 287 |
|---|---|---|---|
| Fresh Catalyst | All catalysts were zeolite 382. | | |
| Binder | All catalysts used SiO₂ binder. | | |
| Deactivation Procedure | Coke fouling as in Example 4. | | |
| Coke Burn | Coke burn as in Example 5. | | |
| Oxychlorination Procedure | The catalyst was contacted with wet air at 1000° F. for 1 hr. Then wet air at 950° F. for 2 hrs. with CCl₄ added to achieve a 20:1 Cl/Pt ratio. A flow rate of 1440 GHSV was used. | The catalysts were contacted with wet air at 950° F. for 2 hrs. with CCl₄ added to achieve a 20:1 Cl/Pt ratio; at the following rates: | |
| | | 480 GHSV | 140 GHSV |
| O₂ Post Treatment | The catalysts were contacted with wet air at 950° F. for 1 hr., but: | | |
| | 1440 GHSV | 480 GHSV | 140 GHSV |
| N₂ Purge | Dry N₂ at 900° F. for 1 hr., but: | | |
| | 1440 GHSV | 480 GHSV | 140 GHSV |
| H₂ Reduction | Dry H₂ at 900° F. for 1 hr., but: | | |
| | 1440 GHSV | 480 GHSV | 140 GHSV |
| Activity Test | | | |
| Conversion: | 75/67 | 57/42 | 13/5 |
| Selectivity: | 81/87 | 71/82 | 45/35 |

EXAMPLE 9

These experiments show the effect of pressure.

| Experiment No. | 778 | 811 |
|---|---|---|
| Fresh Catalyst | L-zeolite 436 | L-zeolite 488 |
| Binder | SiO₂ | SiO₂ |
| | These two catalysts were treated identically to Exp. No. 285 in the: Deactivation Procedure, Coke Burn, O₂ Post Treatment, N₂ purge, and H₂ Reduction. However, Exp. No. 778 was run at 0 psig and Exp. No. 811 was run at 150 psig. Other changes are listed below: | |
| Oxychlorination Procedure | See Exp. No. 285 in Example 8. | See Exp. No. 292 in Example 8, the Cl/Pt ratio was 115 and the time was 20 hours. |
| Activity Test | | |
| Conversion: | 70/60 | 14/0 |

| Experiment No. | 778 | 811 |
|---|---|---|
| Selectivity: | 83/88 | 50/0 |

EXAMPLE 10

These experiments show a compensatory effect for a low flow rate.

| Experiment No. | 297 | 298 |
|---|---|---|
| Fresh Catalyst | L-zeolite 382 | |
| Binder | SiO₂ | |
| | Both catalysts were treated the same as Exp. No. 285 in Example 8 for the: Deactivation Procedure; Coke Burn; Oxychlorination Procedure; and the Hydrogen Reduction, but the flow rate was 480 GHSV. Other changes are listed as follows: | |
| O₂ Post Treatment | The catalyst were contacted with 1% O₂ at 950° F. and 480 GHSV for: | |
| | 3 hrs. | 1 hr. |
| N₂ Purge | The catalyst was contacted with dry N₂ at 900° F. and 480 GHSV for: | |
| | 1 hr. | 3 hrs. |
| Activity Test | | |
| Conversion: | 67/57 | 72/64 |
| Selectivity: | 79/86 | 79/86 |

Experiment Nos. 297, 298, and 292 in Example 8 show how the times can be extended to compensate for the effect of low gas flow rate.

The embodiments of this invention which are exemplified above are intended solely as illustrations of the invention. They should not be interpreted as limiting the scope of the invention to just those features which are exemplified. As those familiar with this area of research will appreciate there are numerous variations of the invention as defined in the following claims which have not been exemplified but which will achieve equivalent results.

What is claimed is:

1. A process for redispersing platinum on a catalyst that has been used for reforming hydrocarbons which comprises platinum, L-zeolite having alkali or alkaline earth metals, and an inorganic binder, the process comprising:
   (a) contacting the catalyst under oxychlorination conditions with a gas comprising 1% to 21% oxygen, 1% to 4% water, and an effective amount of chlorine atoms to achieve a chlorine to platinum ratio between 4:1 to 1000:1;
   (b) contacting the catalyst with a gas consisting essentially of nitrogen for a time between 10 minutes and 1 hour and 30 minutes, at a gas flow rate of between 150 and 1500 GHSV and at a temperature between 850° F. and 950° F.; and
   (c) contacting the catalyst with a gas consisting essentially of hydrogen having less than 1000 ppm water, at a temperature between 875° F. and 925° F., and a gas velocity between 150 and 1500 GHSV.

2. The process as recited in claim 1 wherein the gas consisting essentially of hydrogen contains less than 500 ppm water.

3. The process gas recited in claim 1 wherein the nitrogen contact time is between 30 minutes and 1 hour.

4. The process as recited in claim 1 further comprising removing carbon from the catalyst prior to the oxychlorination procedure.

5. The process as recited in claim 1 further comprising removing sulfur from the catalyst prior to the oxychlorination procedure.

* * * * *

UNITED STATES PATENT AND TRADEMARK OFFICE
CERTIFICATE OF CORRECTION

PATENT NO. : 4,855,269
DATED : August 8, 1989
INVENTOR(S) : Donald H. Mohr

It is certified that error appears in the above-identified patent and that said Letters Patent is hereby corrected as shown below:

Col. 12, Claim 1, line 48, "4:1 to 1000:1" should read --4:1 and 1000:1--.

Col. 12, Claim 3, line 1, "process gas recited" should read --process as recited--.

Signed and Sealed this

Second Day of April, 1991

Attest:

HARRY F. MANBECK, JR.

*Attesting Officer*  *Commissioner of Patents and Trademarks*